United States Patent

Tveter, deceased et al.

[15] 3,635,671
[45] Jan. 18, 1972

[54] CONTINUOUS PREPARATION OF TITANIUM DIOXIDE SEED SUSPENSIONS

[72] Inventors: Elmer C. Tveter, deceased, late of Walnut Creek, Calif. by Cora Belvin Judd Tveter, executrix; Joseph P. Surls, Walnut Creek, Calif.

[73] Assignee: The Dow Chemical Company, Midland, Mich.

[22] Filed: May 7, 1970

[21] Appl. No.: 35,487

Related U.S. Application Data

[63] Continuation-in-part of Ser. No. 694,213, Dec. 28, 1967, abandoned.

[52] U.S. Cl. .................................................23/202 R
[51] Int. Cl. ...............................................C01g 23/04
[58] Field of Search ................................23/202 R, 1, 87

[56] References Cited

UNITED STATES PATENTS

| | | | |
|---|---|---|---|
| 1,758,528 | 5/1930 | Mecklenburg | 23/202 |
| 2,285,486 | 6/1942 | Barksdale | 23/202 |
| 2,337,215 | 12/1943 | Von Bichowsky | 23/202 |
| 2,452,390 | 10/1948 | Olson | 23/202 |
| 2,480,869 | 9/1949 | Mayer | 23/202 |
| 2,511,218 | 6/1950 | Olson et al. | 23/202 |
| 2,519,389 | 8/1950 | Mayer | 23/202 |
| 3,329,484 | 7/1967 | Long et al. | 23/202 |

Primary Examiner—Edward Stern
Attorney—Griswold and Burdick, Bruce M. Kanuch and William R. Norris

[57] ABSTRACT

A continuous process is provided for preparing an opalescent seed suspension of colloidal $TiO_2$ particles, i.e. seed suspension. In this method a stream of an aqueous feed solution having certain chloride, titanium, hydrogen and multivalent ion concentrations is conducted through a heating zone where it is heated to a temperature of between 80° to 125° C. and then the stream is continuously conducted through a reaction zone while maintaining the temperature of the stream within said range. The total period of time (reaction time) during which the stream is maintained within said temperature range is from about 1 to about 30 minutes. The heating and reaction zones are designed and the flow rate of the stream is controlled to prevent back mixing of portions of the flowing stream which differ substantially as to the degree of reaction attained therein.

15 Claims, 4 Drawing Figures

INVENTORS.
Joseph P. Surls
Elmer C. Tveter, deceased,
By Cora Belvin Judd Tveter, executrix.
BY Bruce M Kanuch
ATTORNEY

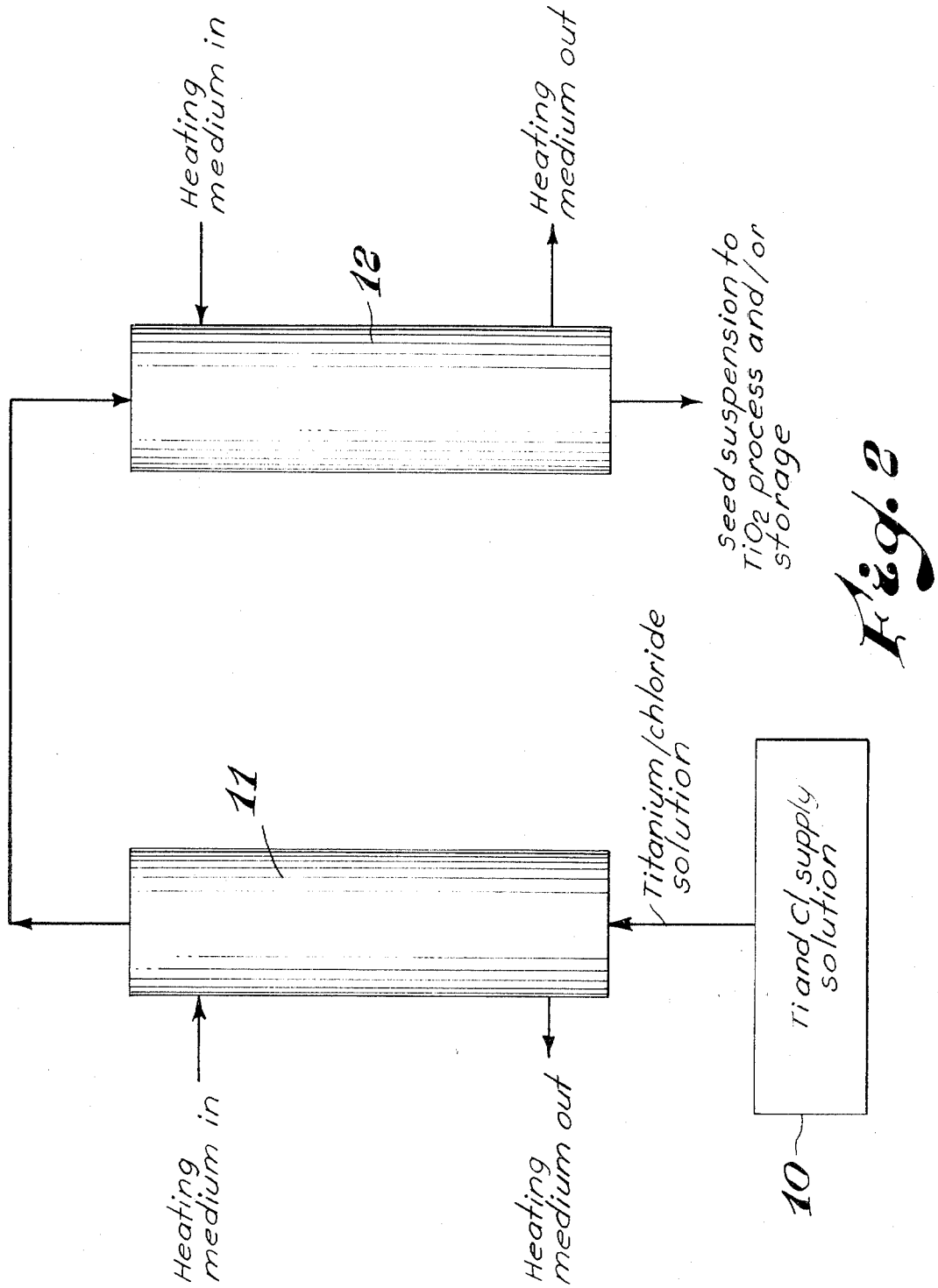

CONTINUOUS PREPARATION OF TITANIUM DIOXIDE SEED SUSPENSIONS

CROSS-REFERENCES TO RELATED APPLICATIONS

This application is a continuation-in-part of application Ser. No. 694,213, filed Dec. 28, 1967, now abandoned.

BACKGROUND

Various methods have been developed for preparing pigment grade $TiO_2$ particles, including the process of U.S. Pat. No. 3,329,484, issued July 4, 1967. In that process an aqueous opalescent seed suspension of colloidal titanium dioxide, i.e., seed suspension, is prepared by reacting, in batch form, a solution having a low chloride/titanium gram-atom ratio with an aqueous solution, i.e., "master solution," having a high gram-atom chloride/titanium ratio, the resulting mixture being hydrolyzed to precipitate titanium dioxide pigments.

The present invention concerns a method for continuously preparing titanium dioxide "seed suspension" which when employed in the production of pigment grade titanium dioxide, such as in the method of said patent, affords the preparation of high quality titanium dioxide pigments. Furthermore, the present invention provides a process for continuously preparing "seed solutions" in contrast to the batch-type methods, as taught for example in U.S. Pat. No. 3,329,484.

SUMMARY OF THE INVENTION

The present invention comprises heating a stream of an aqueous solution having a titanium concentration of not more than 0.6 gram-atoms per liter, a chloride to titanium gram-atom ratio of at least 2, a hydrogen ion concentration such that twice the titanium concentration plus the hydrogen ion concentration is not greater than 1.2 gram-atoms per liter and said solution further being substantially free of multivalent anions, to a temperature of from about 80° to 125° C; maintaining said stream of heated solution at said temperature for from about 1 to about 30 minutes while flowing it through a reaction zone designed so that under the process conditions of the invention bulk back-mixing of portions of the flowing stream which differ substantially as to the degree of reaction attained therein is prevented, thereby forming said seed suspension which is withdrawn from the reaction zone.

The term "titanium" as used herein means titanium in an oxidized state and not elemental metallic titanium.

"Hydrogen ion concentration" as employed herein means the concentration of hydrogen ions present as hydronium ions and bound proton which capable of being freed during the preparation of the pigment grade titanium dioxide.

"Laminar flow" is employed herein to mean the movement of a stream of fluid through a restrictive conduit wherein adjacent layers of the stream of fluid slip past each other with minimal mixing or interchange of fluid from one layer to the other, i.e., "streamline flow." A criterion employed for determining whether a stream of fluid is flowing in the laminar region is the Reynolds number. In this application a Reynolds number of less than about 2,100 is taken as indicative of laminar flow of the stream of fluid.

"Turbulent flow" is employed herein to mean the movement of a stream of fluid through a conduit wherein the fluid particles move down stream in a tumbling, chaotic motion so that localized vortices and eddies are formed in the stream of fluid. This type of flow is characterized as having a Reynolds number of greater than about 2,100. Reference can be made to Craft, Holden and Graves *Well Design, Drilling and Production*, pp. 16-24, Prentice Hall, 1962, for a more complete discussion of the flow of fluids through a conduit.

BRIEF DESCRIPTION OF THE DRAWINGS

FIG. 2 schematically illustrates a preferred embodiment of the present invention.

DETAILED DESCRIPTION OF THE INVENTION

In the practice of the present invention, an opalescent seed suspension of colloidal $TiO_2$ particles, i.e., "seed suspension" is prepared from an aqueous reaction solution having a titanium concentration of, at the maximum, about 0.6 gram-atoms per liter, preferably from 0.2 to 0.42 gram-atoms per liter; a chloride to titanium gram-mole ratio of at least 1.8; preferably from 2.0 to 2.3; a hydrogen concentration such that twice the titanium concentration plus the hydrogen concentration is not greater than 1.2 gram-atoms per liter and a maximum of 0.1 gram-atoms per liter of multivalent anions. A continuous stream of the so-defined aqueous solution is heated to and maintained at a temperature of from about 80° to 125°, preferably about 85° to 100° C., and maintained at said temperature for from about 1 to about 30 minutes, preferably about 5 to 20 minutes, employing process conditions (e.g., flow rate) and reaction zone shapes designed to prevent bulk back-mixing of portions of the flowing stream which differ substantially as to the degree of reaction attained therein, thereby continuously forming said seed suspension. The so-formed $TiO_2$ particles are colloidal having diameters ranging from about 0.002 to about 0.020 micron. The so-prepared seed suspension can be employed for preparing pigment grade titanium dioxide, for example, in the method taught by U.S. Pat. No. 3,329,484.

Bulk back-mixing is prevented by employing conditions of flow, e.g., rate, through any of a variety of properly designed reaction zones, e.g. reactors, mixers and heaters. Laminar, turbulent or sequential combinations of laminar and turbulent flow conditions can be utilized.

Figure 1:
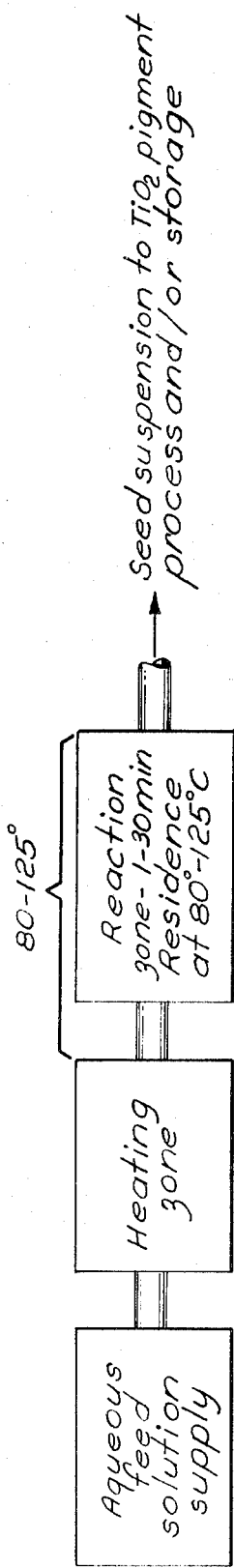
FIG. 1 schematically illustrates the process of the present invention.

The process is schematically illustrated in FIG. 1. A stream of an aqueous feed solution having the characteristics as defined hereinbefore is continuously heated, by conducting it (without back-mixing) through a heating zone, either in turbulent or laminar flow, to a temperature of from about 80° to about 125° C. The so-heated stream is then conducted through a reaction zone and maintained at said temperature for a sufficient period of time to allow the formation of the seed suspension, e.g., it is conducted without back-mixing through a reaction zone, in either laminar or turbulent flow. The heating and reaction zones may be successive portions of a single continuous zone having heating means, or as illustrated, can be separated and connected by a suitable conduit. Whichever method is employed, the heating and reaction zones are designed and the flow rate of the stream adjusted such that the so-heated stream of solution is maintained at said temperature for a reaction time of from about 1 to about 30 minutes thereby continuously producing said seed suspension. The so-formed seed suspension can be stored and/or conducted directly to a $TiO_2$ pigment-producing operation.

As indicated the stream of aqueous feed solution can be flowed through the heating and reaction zones in laminar and/or turbulent flow. The type of flow employed is not critical as long as the zones, e.g., heater and reactor, are so shaped and process conditions are such that back-mixing is prevented.

For example, in one embodiment of the invention a stream of the above-defined aqueous feed solution is conducted through a suitably designed heating zone in turbulent flow. The heating zone is constructed so that the stream of aqueous feed solution is heated to the necessary temperature (80°–125° C.) prior to being conducted to the reaction zone. Preferably, in all the embodiments of the present invention, the stream of aqueous feed solution reaches the indicated reaction temperature just prior to leaving the heating zone. The stream of so-heated solution is then conducted through a reaction zone in either laminar or turbulent flow. If laminar flow in the reaction zone is desired, the reaction zone has a sufficient cross-sectional area to provide a rapid transition from turbulent to laminar flow at the flow rate employed. The reaction zone must be sufficiently long so that the reaction time of from 1 to 30 minutes at a temperature of 80° to 125° C., preferably 5-20 minutes, can be achieved to form the seed suspension. In another embodiment the stream of heated solution from the heating zone (where it was in turbulent flow) is conducted through a reaction zone which has a cross-sectional area such that at the volume flow rate employed turbulent flow results and back-mixing is prevented. The reaction zone again must be sufficiently long so that the required reaction time is achieved.

Still another embodiment comprises conducting a stream of feed solution through both a heating and reaction zone in laminar flow or through a heating zone in laminar flow and through the reaction zone in turbulent flow.

A preferred embodiment of the invention is schematically illustrated in FIG. 2. In this embodiment a stream of aqueous feed solution is continuously conducted from a supply source 10 upwardly through a substantially vertical heater 11 in laminar flow wherein the stream of solution is heated to a temperature of from about 80° to about 125° C. Preferably the heating zone is designed (e.g., length, volume, etc.) so that at the flow rate employed the stream of solution reaches said temperature just prior to exiting from the top of the heater. The stream of heated solution is then conducted downwardly in laminar flow through a substantially vertical reactor 12, while maintaining the stream of heated solution within said temperature range. The rate of flow is so controlled and the heater and reactor are so designed that the stream of heated solution is maintained at said temperature for a period of from about 1 to about 30 minutes. The exact reaction time required to form the seed suspension when employing a reaction temperature of 80° or more is dependent on the temperature employed. For example, at a reaction temperature of about 85° C. the reaction time should preferably be at least about 4 minutes and not over about 30 minutes; at a temperature of 100° C. the reaction time should preferably be at least about 2 minutes and not over about 15 minutes, and at a temperature of about 125° C. the reaction time should preferably be at least about 1 minute and preferably not greater than about 10 minutes. As indicated, a temperature of about 85° to 100° C. and reaction time of from about 5 to 20 minutes is preferred.

In this embodiment the heater 11 and reactor 12 are so designed, and the stream of aqueous reaction solution conducted at such a rate, that the flow of the stream of solution is laminar, i.e., streamline. This type of flow substantially prevents bulk back-mixing of portions of the flowing stream which differ substantially as to the degree of reaction attained therein, and of heated solution with cooler solution. It has been found that bulk back-mixing must be substantially prevented in order to effectively prepare seed suspension in a continuous process, said seed suspensions having desirable characteristics for preparing $TiO_2$ pigments. In this embodiment back-mixing is prevented in the following manner. By conducting the stream of aqueous reaction solution upwards in the heater 11 in laminar flow the thermally induced density gradient of the stream of solution is not opposed to the direction of the flow of the stream of solution and, therefore, back-mixing is prevented. As indicated it is also preferred that the heater 11 be designed (e.g., length and cross-sectional area) and flow rate of the stream of aqueous reaction solution controlled so that the stream of aqueous reaction solution reaches a temperature of from about 80° to about 125° C. just prior to exiting from the heater 11.

The seed suspension is formed in the reactor 12. Back-mixing is prevented by the fact that the flow of the stream is laminar and downward, so that as the titanium dioxide particles grow to colloidal size and become denser they tend to settle in the direction of flow, rather than against it. Also, by allowing the stream of solution to gradually cool somewhat as it passes through the reactor 12, the existence of any thermally induced density gradient opposed to the flow of the solution is avoided and back-mixing is further prevented. To achieve this type of heating the heating medium, as shown in FIG. 1, flows opposite to the flow of the stream of feed solution in the heater 11 and parallel to the flow of the stream of reaction solution in the reactor 12. To maintain a density gradient in the reaction zone which is not opposed to the flow of the stream the temperature of the stream should not at any point be higher than at a previous point in the zone.

In all of these embodiments the design of the heating and reaction zones can be varied to assure that the reaction conditions, e.g., temperature, reaction times at the indicated temperature range, laminar or turbulent flow and prevention of bulk back-mixing are achieved. Heating and reaction zones which can be employed in processes wherein the stream of reaction solution is to be conducted under turbulent flow conditions generally must have a relatively small cross-sectional area. They must also have a smooth inner surface free from sharp angled bends or lips so that the flow of the stream of reaction solution therethrough will remain substantially free from stagnant volumes and back eddies. The reaction and heating zones employed for laminar flow conditions generally have a larger cross-sectional are but likewise should have similar inner surfaces. The exact size, e.g. length, cross section area, etc., of the heating and reaction zones will be determined by the type of flow desired, the flow rate desired, the size of operation desired and the like. The reaction and heating zones can be constructed of any suitable material which is substantially inert to the reactants and products of the invention. Suitable materials include, for example, glass lined steel, glass, fluorinated ethylene polymer, and other like materials. Likewise, the heating and reaction zones may be constructed as a one piece conduit or may be separated by a section of insulated tubing or the like.

The stream of aqueous feed solution having the characteristics defined hereinbefore can be prepared from a number of source materials and in a number of different ways. For example, a concentrated aqueous solution of $TiCl_4$ (produced from the direct chlorination of titanium containing materials), can be diluted with water and the pH of the solution adjusted by the addition of a base such as, for example, NaOH. Another suitable iron-free titanium chloride solution is that obtained from the dissolution of a titaniferrous material by hydrochloric acid with a subsequent solvent extraction for iron removal as set forth by Ellis, in U.S. Pat. No. 3,104,950, issued Sept. 24, 1963. Preferably excess HCl is removed (e.g., by evaporation or ion exchange) to produce a solution having the desired chloride/titanium ratio. The concentrate is then diluted with water with or without the additional neutralization to make a solution having the indicated concentrations. The titanium content of the concentrate should preferably be about 200 grams per liter (i.e., about 4.2 gram-atoms per liter). The concentrate can be diluted by the addition of water to form the aqueous feed solution.

Figure 3:
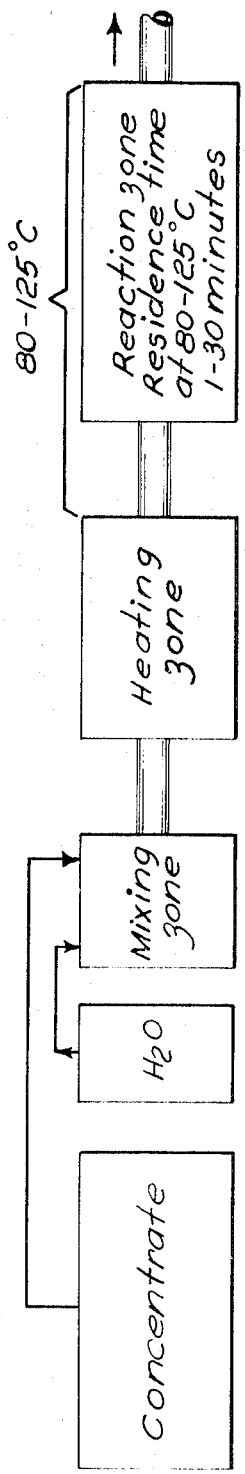
FIGS. 3 and 4 schematically illustrate still other embodiments of the invention.

If desired the preparation of the feed solution can be made a part of the continuous process for preparing the seed suspensions. In one embodiment, schematically illustrated in FIG. 3, a concentrated solution (as defined hereinbefore) is mixed with a required amount of water in a mixer at a temperature of less than about 70° C. and a stream thereof conducted through the heating and reaction zones in a manner as defined hereinbefore. The mixer may be any type of mixer known in the art, e.g., paddle blades, turbulent flow through a restrictive conduit, or the like.

Figure 4:
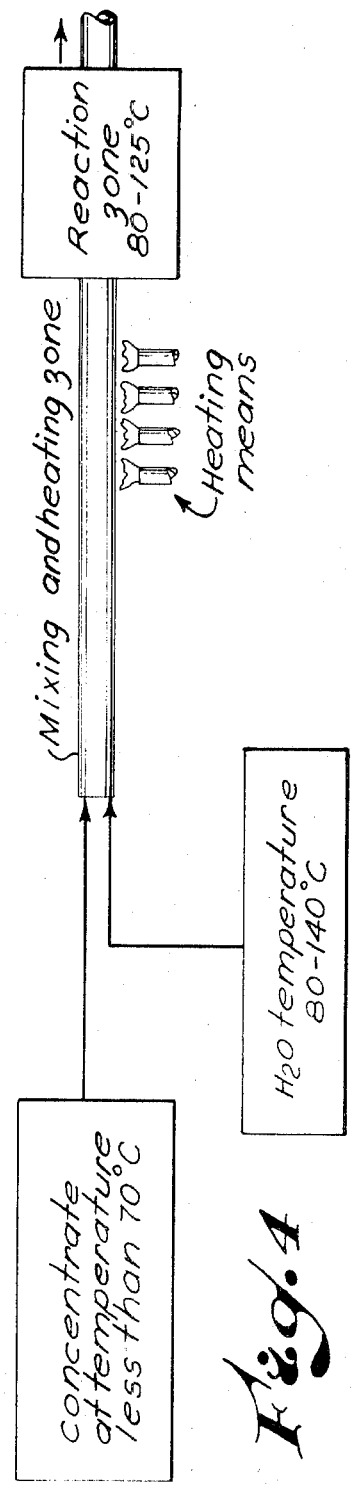

Also, the concentrate may be concurrently diluted and heated to the reaction temperature of from between 80° and 125° C. When this procedure is followed the mixing and heating should be completed in a short time and the flow of the stream of the feed solution thereafter must be under conditions which prevent back-mixing since the solution is now at the reaction temperature (80°–125° C). The previously defined heating zone now becomes a combined mixing and heating zone. One means for concurrently mixing and heating is schematically illustrated in FIG. 4. In this embodiment a stream of concentrate at a maximum temperature of 70° C.

and a stream of water at a temperature of from about 80° to 140° C. are conducted from source supplies through a conduit which has a cross-sectional area such that turbulent flow results at the volume rate of flow employed, (Reynolds number of at least 2,100, preferably greater). Ordinarily mixing is accomplished in the first part of the conduit by the turbulent flow and back-mixing, as defined earlier herein, is prevented in the remaining section of the conduit by the same turbulent character of the flow. The length of the mixing zone should be sufficient to provide a residence time of the stream of water and concentrate of at least about 0.1 second, at the flow rate employed, with a Reynolds number of at least 2,100. Any additional length is not critical in this embodiment.

As previously indicated, the multivalent anion concentration in the seed solution should not exceed about 0.1 gram-atoms per liter. It has been found that the tinting strength of the $TiO_2$ pigments made using the presently described "seed solutions" are detrimentally affected when concentration of multivalent anions exceed 0.1 molar. The presence of multivalent cations and univalent anions of much higher concentrations have not been found to detrimentally affect the tinting strength of the final $TiO_2$ pigment product.

The following examples will facilitate a more complete understanding of the present invention but it is understood that it is not limited thereby.

EXAMPLE 1

A stream of a concentrated aqueous solution containing 200 grams of Ti per liter (about 4.2 gram-atoms per liter) and 8.4 gram-atoms per liter of $Cl^-$ was mixed, at a flow rate of about 0.7 ml./min. with a stream of water which was flowing at a rate of about 9.8 ml./min. The resulting stream of dilute aqueous feed solution contained 0.08 gram-atoms/liter of HCl and about 12.8 grams (about 0.27 gram-atoms) of Ti per liter. This stream was passed in laminar flow upwardly through a substantially vertical 1.2 cm. ID by 30 cm. long glass heating tube provided with a jacket through which hot water (temperature of ≈90° C.) was passed in downflow. The hot effluent stream of solution from the heater was continuously passed downwardly in laminar flow through a vertical 1.2 cm. ID by 60 cm. long glass reactor tube provided with a jacket through which hot water (temperature of less than 90° C.) was passed in downflow so as to maintain the stream of solution at a temperature of about 85° C. or slightly less whereupon an opalescent seed suspension of colloidal titanium dioxide was formed. The residence times in the heater and reactor were 6 and 12 minutes respectively with a total of 18 minutes. The seed suspension from the reactor was cooled to about 30° C. by passing it through a downflow cooler tube and collected.

The so-produced seed suspension was employed in a process similar to that described in U.S. Pat. No. 3,329,484 and the resulting unclaimed $TiO_2$ pigment gave a tinting strength of about 2,050 using the standard test Reynolds tinting strength composition) as employed in the examples of that patent.

EXAMPLE 2

A "seed suspension" having substantially the same concentrations and prepared in a manner substantially identical to that described in example 1, except that the heater and reactor were maintained at about 80° C., was employed in the same process to produce $TiO_2$ pigments. The tinting strength of uncalcined $TiO_2$ pigment was about 1,600.

EXAMPLE 3

A seed suspension was prepared as in example 1 having a Ti concentration of about 0.5 gram-atoms per liter and HCl concentration of about 0.15 gram-atoms per liter. The tinting strength of the finally produced $TiO_2$ pigment was about 1950.

EXAMPLE 4

A seed solution was prepared having substantially the same concentrations and in substantially the same manner as in example 1 except the heater and reactor were maintained at about 100° C. The tinting strength of $TiO_2$ pigment produced from the so-prepared seed suspension was about 2,000.

EXAMPLE 5

A seed suspension containing about 0.6 gram-atoms per liter of Ti and less than about 0.01 gram-atoms per liter of HCl was prepared in a manner substantially identical to that in example 4. $TiO_2$ pigment produced using this seed suspension had a tinting strength of about 1000.

In examples 6–25 the seed suspensions were prepared in batch-type procedures since it was only desired to determine the effect of the various concentrations of ions on the quality of the resulting seed suspensions and no difference in this effect could exist for batch versus continuous operation.

EXAMPLES 6–17

A series of seed suspensions were prepared under essentially identical process conditions but varying the concentrations of hydrogen and titanium ions in the aqueous reaction solution to illustrate the effect of having a hydrogen concentration such that $2(Ti)+(H+)$ was not greater than 1.2 on the tinting strength of $TiO_2$ pigments prepared employing these seed suspensions. Various compounds other than those having multivalent anions were added to some of the seed suspension to vary the hydrogen concentration and to also illustrate the fact that such anions do not substantially affect the tinting strength of $TiO_2$ pigments produced employing such suspensions. All the seed suspensions were prepared essentially as described in U.S. Pat. No. 3,329,484, and at a temperature of about 100° C. and with residence times of about 8 minutes. The resulting seed suspension was cooled to a temperature of about 25° C. and than employed under essentially identical operating conditions to prepare $TiO_2$ pigments. The following table I sets forth the variations in the compositions of each "feed solution" and the resulting tinting strength of $TiO_2$ pigments produced employing each suspension produced.

TABLE I
(Variance of $2[Ti]+[H+]$)

| Example | Ti, g./l. | M [HCl] | Additive, M | $2[Ti]+[H+]$ | Tinting strength |
|---|---|---|---|---|---|
| 6 | 17.0 | 0.36 | 0.09 | | 0.81 | 2,050 |
| 7 | 23.8 | 0.50 | 0.14 | | 1.14 | 1,050 |
| 8 | 28.8 | 0.60 | 0.18 | | 1.38 | 500 |
| 9 | 12 | 0.25 | 0.06 | 0.25 HCl | 0.81 | 2,050 |
| 10 | 12 | 0.25 | 0.06 | 0.50 HCl | 1.06 | 1,050 |
| 11 | 12 | 0.25 | 0.06 | 0.75 HCl | 1.31 | 700 |
| 12 | 12 | 0.25 | 0.06 | 0.24 $HClO_4$ | 0.84 | 1,950 |
| 13 | 12 | 0.25 | 0.06 | 0.48 $HClO_4$ | 1.08 | 1,250 |
| 14 | 12 | 0.25 | 0.06 | 0.73 $HClO_4$ | 1.37 | 850 |
| 15 | 10.9 | 0.23 | 0.08 | 0.25 $HNO_3$ | 0.79 | 2,250 |
| 16 | 10.9 | 0.23 | 0.08 | 0.50 $HNO_3$ | 1.04 | 1,550 |
| 17 | 10.9 | 0.23 | 0.08 | 0.75 $HNO_3$ | 1.29 | 950 |

Examples 8, 11, 14 and 17 show the detrimental affect on tinting strength when the seed solution was prepared from a reaction solution having a hydrogen concentration such that twice the titanium concentration plus the hydrogen concentration was greater than 1.2.

EXAMPLES 18–25

To show the noncriticality of the presence of multivalent cations various seed suspensions were prepared under the same operating conditions as employed in examples 6–17 but adding various compounds having multivalent cations to the aqueous feed solution. The tinting strengths of resulting $TiO_2$ pigments produced employing seed suspensions prepared from such reaction solutions and the operating conditions are set forth in the following table II.

TABLE II
(Effect of multivalent cation salts)

| Example | Ti, g./l. | [HCl], M | M | Additive, M | 2[Ti]+[H+] | Tinting strength |
|---|---|---|---|---|---|---|
| 18 | 15 | 0.3 | 0.1 | 0.33 $AlCl_3$ | 0.7 | 2,150 |
| 19 | 15 | 0.3 | 0.1 | 0.9 $AlCl_3$ | 0.7 | 1,750 |
| 20 | 15 | 0.3 | 0.1 | 1.0 $CdCl_2$ | 0.7 | 2,050 |
| 21 | 15 | 0.3 | 0.1 | 0.3 $Ca(NO^3)_2$ | 0.7 | 2,150 |
| 22 | 15 | 0.3 | 0.1 | 1.0 $Ca(NO^3)_2$ | 0.7 | 2,150 |
| 23 | 15 | 0.3 | 0.1 | 1.5 $Ca(NO^3)_2$ | 0.7 | 1,950 |
| 24 | 20 | 0.4 | 0.2 | 0.8 NaCl | 1.0 | 1,600 |
| 25 | 10 | 0.2 | 0.1 | 0.5 NaCl | 0.5 | 1,900 |

Examples 18–22 show that multivalent cations do not detrimentally affect the quality of the $TiO_2$ pigments.

EXAMPLES 26–33

To illustrate the criticality of minimizing the concentration of compounds having multivalent anions in the aqueous feed solution employed to prepare seed suspensions a series of seed suspensions were prepared under essentially identical operating conditions as in examples 6 through 25 except that various compounds having multivalent anions were introduced to the initial aqueous reaction solution. The tinting strengths of $TiO_2$ pigments prepared employing the "seed suspensions" were determined. The operating so produced conditions and resulting tinting strengths are set forth in following table III.

TABLE III
(Effect of multivalent anions)

| Example | [Ti], M | [HCl]≈[H+], M | Additive | Additive, M | Tinting strength |
|---|---|---|---|---|---|
| 26 | 0.3 | 0.1 | {$Na_2SO_4$, $NaHSO_4$} | 1.0 | <400 |
| 27 | 0.3 | 0.1 | $NaHSO_4$ | 0.30 | <1,000 |
| 28 | 0.3 | 0.1 | $NaHSO_4$ | 0.10 | 1,000 |
| 29 | 0.3 | 0.1 | $NaHSO_4$ | 0.01 | 2,150 |
| 30 | 0.3 | 0.1 | $H_3PO_4$ | 0.10 | [1] Ppt'd |
| 31 | 0.3 | 0.1 | $H_3PO_4$ | <0.01 | 1,950 |
| 32 | 0.3 | 0.1 | $NaH_2PO_4$ | 1.00 | [1] Ppt'd |
| 33 | 0.3 | 0.1 | $NaH_2PO_4$ | 0.10 | [1] Ppt'd |

[1] No colloidal suspension could be formed.

The $HSO_4^-$ ion is shown to detrimentally affect the quality of the final $TiO_2$ pigment similarly as do polyvalent anions.

EXAMPLE 34

In the previous examples back-mixing was prevented by maintaining laminar flow through suitable heaters and reactors, or batch preparation was satisfactory for the purpose of the experiment and back-mixing was not prevented. Excellent seed suspensions were prepared when the reaction solution met the composition requirements defined hereinbefore. In the present example an attempt was made to prepare seed continuously but otherwise duplicating the conditions employed in the conventional batch process as nearly as possible. The seeds produced were unsuitable for use in preparing $TiO_2$ pigments. The operating apparatus consisted of a series of nine cylindrical, two-part, glass pots set up in a cascade arrangement for gravity flow. Each pot was connected to the next lower pot by a vinyl tube, sold under the trademark Tygon. Each pot, except the first, was gently stirred with a magnetic stirrer and was separately wound with a controlled resistance heating tape. In operation a concentrated aqueous titanium chloride reaction solution (200 grams Ti per liter) was continuously introduced into the uppermost pot in the series together with sufficient water to produce a diluted aqueous reaction solution containing 15 grams (0.32 gram-atoms) titanium per liter and 0.6 gram-atoms of $Cl^-$ per liter. The first pot was stirred more vigorously and was operated as a mixer at room temperature. The dilute aqueous reaction mixture effluent from the mixer (first upper pot) was passed continuously down through the series of reactors, comprising pots 2 through 9, at a flow rate of about 1.5 ml./min. where the solution was heated to and held at a temperature of about 85°. The total residence time at ~85° in the 8 reactors was about 19 minutes. Since each pot was continuously stirred, more completely reacted solution in each pot was unavoidably back-mixed with less completely reacted solution flowing from the next higher reactor pot. The $TiO_2$ particles produced by this procedure were not suitable for use as a seed suspension in the preparation of $TiO_2$ pigments as evidenced by the milky white appearance of the resulting $TiO_2$ suspension.

A second run was made as previously described except that the reactor pots 2–9 were maintained at 100° C. Again the $TiO_2$ particles produced were unsuitable for use as seed in the preparation of $TiO_2$ pigments as evidenced by the milky white appearance of the $TiO_2$ suspension.

We claim:

1. A continuous process for preparing an opalescent seed suspension of colloidal titanium dioxide particles which comprises:
   a. heating a stream of an aqueous feed solution having a titanium concentration at the maximum of about 0.6 gram-atoms per liter, a chloride to titanium gram-mole ratio of at least 1.8, a hydrogen concentration such that twice the titanium concentration plus the hydrogen concentration at the maximum is about 1.2 gram-atoms per liter and not more than 0.1 gram-atoms per liter of multivalent anions, by flowing the stream through a heating zone at a rate of flow adjusted to prevent substantial back-mixing of heated and unheated portions of the stream to a temperature of from about 80° to about 125° C;
   b. conducting the flowing stream of heated solution at a temperature of from about 80° to about 125° C. through a reaction zone, said stream being maintained at said temperature for a total period of from about 1 to about 30 minutes, at a flow rate adjusted to prevent bulk back-mixing of reacted portions of the flowing stream containing titanium dioxide particles with the unreacted portion of the flowing stream which does not contain said titanium dioxide particles; and
   c. continuously removing said seed suspension from said reaction zone.

2. The process as defined in claim 1 wherein the titanium dioxide particles range in size from about 0.002 to about 0.020 micron.

3. The process as defined in claim 1 wherein the titanium concentration in said stream of aqueous feed solution ranges from about 0.3 to about 0.42 gram-atoms per liter.

4. The process as defined in claim 1 wherein said hydrogen concentration in said stream of aqueous feed solution is such that twice the titanium concentration plus the hydrogen concentration ranges from about 0.36 to about 0.6 gram-atoms per liter.

5. The process as defined in claim 1 wherein the stream of aqueous feed solution is heated to a temperature of from about 85° to about 100° C. and maintained at said temperature for from about 5 to about 20 minutes to form said seed suspension.

6. A continuous process for preparing an opalescent seed suspension of colloidal titanium dioxide particles which comprises:
   a. heating a stream of an aqueous feed solution having a titanium concentration at the maximum of about 0.6 gram-atoms per liter, a chloride to titanium gram-mole ratio of at least 1.8, a hydrogen concentration such that twice the titanium concentration plus the hydrogen concentration at the maximum is about 1.2 gram-atoms per liter and not more than 0.1 gram-atoms per liter of multivalent anions to a temperature of from about 80° C. to about 125° C. while flowing said stream upwardly in laminar flow, said flow characterized as having a Reynolds number of less than about 2,100, through a substantially vertical heating zone to form a heated feed solution;
   b. conducting the flowing stream of heated solution at a temperature of from about 80° to about 125° C. through a reaction zone, said stream being maintained at said temperature for a total period of from about 1 to about 30 minutes, at a flow rate adjusted to prevent bulk back-mixing of reacted portions of the flowing stream containing titanium dioxide particles with the unreacted portion of the flowing stream which does not contain said titanium dioxide particles; and
   c. continuously removing said titanium dioxide particles from said reaction zone.

7. The process as defined in claim 6 wherein said stream of heated feed solution from said heating zone is conducted at a temperature not greater than the temperature of the stream from the heating zone downwardly in laminar flow through a substantially vertical reaction zone to form said seed suspension said reaction zone being characterized as designed to prevent bulk back-mixing of portions of the stream which differ substantially as to the degree of reaction attained therein and said laminar flow is characterized as having a Reynolds number of less than about 2,100.

8. The process as defined in claim 6 wherein said stream of heated feed solution is conducted at said temperature through a reaction zone having a sufficiently restricted cross-sectional area such that at the volume flow rate of the stream turbulent flow characterized as having a Reynolds number of greater than about 2,100 results, thereby forming said seed suspension while preventing bulk back-mixing of portions of said stream differing substantially as to the degree of completion of the reaction attained therein.

9. The process as defined in claim 1 including continuously mixing a stream of a concentrated aqueous solution with a stream of water in a mixing zone in turbulent flow in proportions required to form said aqueous feed solution.

10. The process as defined in claim 9 wherein said concentrated aqueous feed solution contains at least about 4.2 gram-atoms per liter of titanium and a chloride to titanium gram-mole ratio of at least 2.

11. A continuous process for preparing an opalescent seed suspension of colloidal titanium dioxide particles which comprises:
   a. mixing a stream of concentrated aqueous solution, containing at least about 4.2 gram-atoms per liter of titanium and a chloride to titanium gram-mole ratio of at least 2 and having a temperature of less than about 70° C., with a sufficient quantity of a stream of water having a temperature of from about 80° to 140° C. to provide a heated flowing stream of aqueous feed solution having a temperature of from about 80° to about 125° C., the flow of said stream being characterized by an average Reynolds number of greater than about 2,100;
   b. conducting said heated stream at said temperature through a reaction zone, said stream being maintained at said temperature for a total period of from about 1 to about 30 minutes, at a flow rate adjusted to prevent bulk back-mixing of reacted portions of the flowing stream containing titanium dioxide particles with the unreacted portion of the flowing stream which does not contain said titanium dioxide particles; and
   c. continuously removing said seed suspension from said reaction zone.

12. A continuous process for preparing an opalescent seed suspension of colloidal titanium dioxide particles which comprises:
   a. heating a stream of an aqueous feed solution having a titanium concentration at the maximum of about 0.6 gram-atoms per liter, a chloride to titanium gram-mole ratio of at least 1.8, a hydrogen concentration such that twice the titanium concentration plus the hydrogen concentration at the maximum is about 1.2 gram-atoms per liter and not more than 0.1 gram-atoms per liter of multivalent anions, by flowing said stream through a heating zone in turbulent flow, said flow characterized as having a Reynolds number of greater than about 2,100, to a temperature of from about 80° to about 125° C;
   b. conducting the flowing stream of heated solution at a temperature of from about 80° to about 125° C. through a reaction zone, said stream being maintained at said temperature for a total period of from about 1 to about 30 minutes, at a flow rate adjusted to prevent bulk back-mixing of reacted portions of the flowing stream containing titanium dioxide particles with the unreacted portion of the flowing stream which does not contain said titanium dioxide particles; and
   c. continuously removing said seed suspension from said reaction zone.

13. The process as defined in claim 11 wherein the heated stream of aqueous feed solution is flowed downwardly in laminar flow characterized as having a Reynolds number of less than about 2,100 through a substantially vertical reaction zone, while maintained at a temperature not greater than the temperature thereof when entering the reaction zone.

14. The process as defined in claim 12 wherein said stream of heated feed solution at said temperature is conducted through said reaction zone in turbulent flow characterized as having a Reynolds number of greater than about 2,100 so that back-mixing of portions of the flowing stream which differ substantially as to the degree of reaction attained therein is avoided, thereby forming said seed suspension.

15. The process as defined in claim 12 wherein said stream of heated reaction solution at said temperature is conducted downwardly in laminar flow characterized as having a Reynolds number of less than about 2,100 through a substantially vertical reaction zone to form said seed suspension, said reaction zone being designed to prevent bulk back-mixing of portions of the flowing stream which differ substantially as to the degree of reaction attained therein.

* * * * *